United States Patent [19]

Tsipov

[11] Patent Number: 4,508,141

[45] Date of Patent: Apr. 2, 1985

[54] SHOWER VALVE

[76] Inventor: Mikhail E. Tsipov, 120 Ruth Ellen, Cleveland, Ohio 44143

[21] Appl. No.: 474,204

[22] Filed: Mar. 10, 1983

[51] Int. Cl.³ ...................... F16K 19/00; F16K 31/60
[52] U.S. Cl. ........................................ 137/560; 4/192; 4/628; 137/607; 251/369
[58] Field of Search .................. 4/191, 192, 605, 628; 137/560, 606, 607, 802; 251/369

[56] References Cited

U.S. PATENT DOCUMENTS

| | | | |
|---|---|---|---|
| 915,459 | 3/1909 | Minns | 137/606 |
| 1,525,393 | 9/1922 | Jernatowski | |
| 1,583,944 | 5/1926 | Van Eweyk | 4/191 |
| 1,683,566 | 9/1928 | Mix | 137/560 X |
| 2,507,943 | 5/1950 | Swilik | 4/192 |
| 3,639,920 | 2/1972 | Griffin | 4/628 |
| 3,774,643 | 11/1973 | Cole et al. | 137/636.4 |

FOREIGN PATENT DOCUMENTS 1177634  4/1959  France ................................ 137/606

Primary Examiner—Robert G. Nilson
Attorney, Agent, or Firm—Woodrow W. Ban

[57] ABSTRACT

A valve for interrupting the flow of water between a source and a showerhead wherein the valve includes a soap dish moveable from a closed to an open, soap retrieving position, the soap dish being attached to the valve whereby movement of the soap dish to the closed position permits flow of water through the valve to the showerhead, and movement of the soap dish to an open, soap retrieving position closes the valve interrupting water flow to the showerhead. Soap is therefore only accessible when the water flow is interrupted.

7 Claims, 10 Drawing Figures

SHOWER VALVE

FIELD OF THE INVENTION

This invention relates to valves and valving systems, and more particularly to plumbing valves for use in commercial and residential plumbing installations. Specifically, this invention relates to valves for the control of water flow to bathroom or changehouse shower installations.

BACKGROUND OF THE INVENTION

Showering enjoys a considerable popularity in society both in the residential setting and in the commercial world. Among the factors believed contributing to the popularity of showering are its convenience and perhaps enhanced hygiene relative to bathing.

A shower can be undertaken virtually as soon as water of a desired temperature is available; there is no waiting for a bath tub to fill. A shower can be accomplished quickly without the need to alternately stand and sit for lathering and rinsing. In a shower, the user does not soak in water contaminated with material washed from his or any one elses's body. The temperature of a shower can be adjusted by simply altering the flows of hot and cold water being mixed to produce the shower; it is not necessary to alter the temperature of an entire tub of water.

A shower can be accomplished in a relatively economical surface area, generally about ½ the floor area needed for a personal bath. In an industrial setting a large number of people can be provided with a showering position with each enjoying a stream of fresh water for showering uncontaminated by contact with the skin of another. The floor space necessary for accommodating the showerees is generally about ½ or less of what would be required for individual bathing tubs and the cost of providing individual showers as opposing individual bathing tubs is relatively quite small.

In addition, for many users, a shower can be more efficient from the standpoint of water usage. Depending upon the flow of water through a showerhead during a shower, and the duration of the shower, a lesser quantity of water generally is consumed in showering as opposed to that consumed during bathing in bathing in individual tubs.

More recently, with substantial increases in the cost of energy required to produce heated water generally desirable for either showering or bathing, the quantity of water consumed during bathing or showering has, for some, become of increasing importance. While the economic impact of shower water flowing for an extra minute each day during a home shower may not be of particular importance to the homeowner, the impact of a hundred or more showers flowing a minute longer each day in a commercial setting may have significant economic impact. It becomes desirable therefore to identify and implement methods for reducing still further the quantity of water consumed during showering.

Where water supplies are scarce and/or costly, achieving reductions in the quantity of water consumed during showering acquires additional importance. Where water rationing has been imposed, individuals may find methods for automatically curtailing the flow of water during a shower to be attractive. Particularly where persons using a showering station have no personal or vested interest in conserving water flow through a shower, such as in hotels, motels, changehouses, and in certain residential settings, non discretionary methods for curtailing shower water flows could find considerable utility.

A number of proposals have been put forward to assist in conservation of water during showering. The most simple, of course, consists of requesting users to turn off the flow of shower water during periods when water flow is not essential, such as during lathering. With most shower valves, however, a shower water flow is achieved by adjusting separate flows of hot and cold water directed to a showerhead. Re-establishment of a suitably temperate mixture following a discontinuance of flow can produce an occasional traumatic contact with water of a substantially undesired temperature. Further, where a shower user having no vested interest in water flow conservation balks at voluntary conservation, little can be done to enforce this voluntary method of conservation in such a closely personal environment such as a shower.

In another proposal, a flow of shower water has been timed to provide water for a period necessary to complete showering for a typical user. Often the flow periods have been divided to provide a short period for wetting the showeree's body, followed by a second period for rinsing lather from the showeree's body. Such timed flows can leave a deliberate shower user soapy, only partially cleaned, and/or otherwise unhappy.

In another quite common proposal, a valve is provided in the supply of water to the showerhead by which the flow of water to the showerhead may be interrupted. Typically this valve is located upon the showerhead and functions regulate the intensity and perhaps the pattern of water flow through the showerhead as well as in some proposals to substantially terminate water flow through the showerhead. Such valves rely, however, upon discretionary use by the individual showering, and typically are ignored by most users.

The period of a shower wherein the individual is lathering with soap or shampoo is particularly amenable to elimination of water flow. Water flow is generally not necessary for the lathering process once the individual showering is wetted thoroughly, and may actually be detrimental by dint of washing away a portion of lather being generated before the lather can be used to effectively clean the individual's body. A method for involuntarily restricting, or preferably involuntarily eliminating water flow during the lathering phase of a shower could find wide application particularly where the showers are utilized by individuals having no incentive or vested interest in reducing water flows during a shower voluntarily.

DISCLOSURE OF THE INVENTION

The present invention provides a valve for restricting or eliminating water flow to a showerhead during the lathering phase of a shower. Elimination of water flow is activated by the physical act of retrieving soap or shampoo for use in lathering, and water flow is re-established by closing access to the soap or shampoo.

The valve includes a valve body and a means within the valve body for interrupting water flow through the valve body as well as an actuating means for imposing the interrupting means into the water flow thereby reducing or terminating water flow through the valve body. The actuating means includes a receptacle for soap and/or shampoo, hereinafter soap, the receptacle being moveable between a closed position and an open position by which soap can be retrieved from the receptacle. The actuating means is configured whereby with the receptacle in the closed position, water flow through the valve is uninterrupted by the interrupting means, and with the receptacle in the open or retrieval position, water flow through the valve is interrupted by the interrupting means.

Preferably the valve is of configuration wherein only a ¼ rotational turn or less of the actuating means is required to interrupt the water flow, such as a ball valve, plug valve, or certain configurations of a diaphragm valve. In certain preferred embodiments the source of water is a divided source or dual source of hot and cold water, and the valve includes a section for mixing the hot and cold water in a virtually infinite ratio. The mixing section provides a ratio of hot and cold water that is maintained not withstanding an interruption of water flow induced by opening of the receptacle, so that when water flow to the showerhead is re-established, the water flow is immediately of a desirably temperate character.

The valve of the present invention without the mixing section can be used as an addition to an existing plumbing installation supplying a shower, or, with a mixing section, can be substituted for an existing plumbing system for controlling a mixed water flow from hot and cold sources to a showerhead. In plumbing systems providing a water flow a a predetermined temperature for use in showers and/or baths, the valve of this invention may be installed without the mixing section to eliminate shower water flow during lathering.

The above and other features and advantages of the invention will become more apparent when considered in conjunction with a preferred description of the invention and the drawings that follow, together comprising a portion of the specification.

BEST EMBODIMENT OF THE INVENTION

Figure 1:
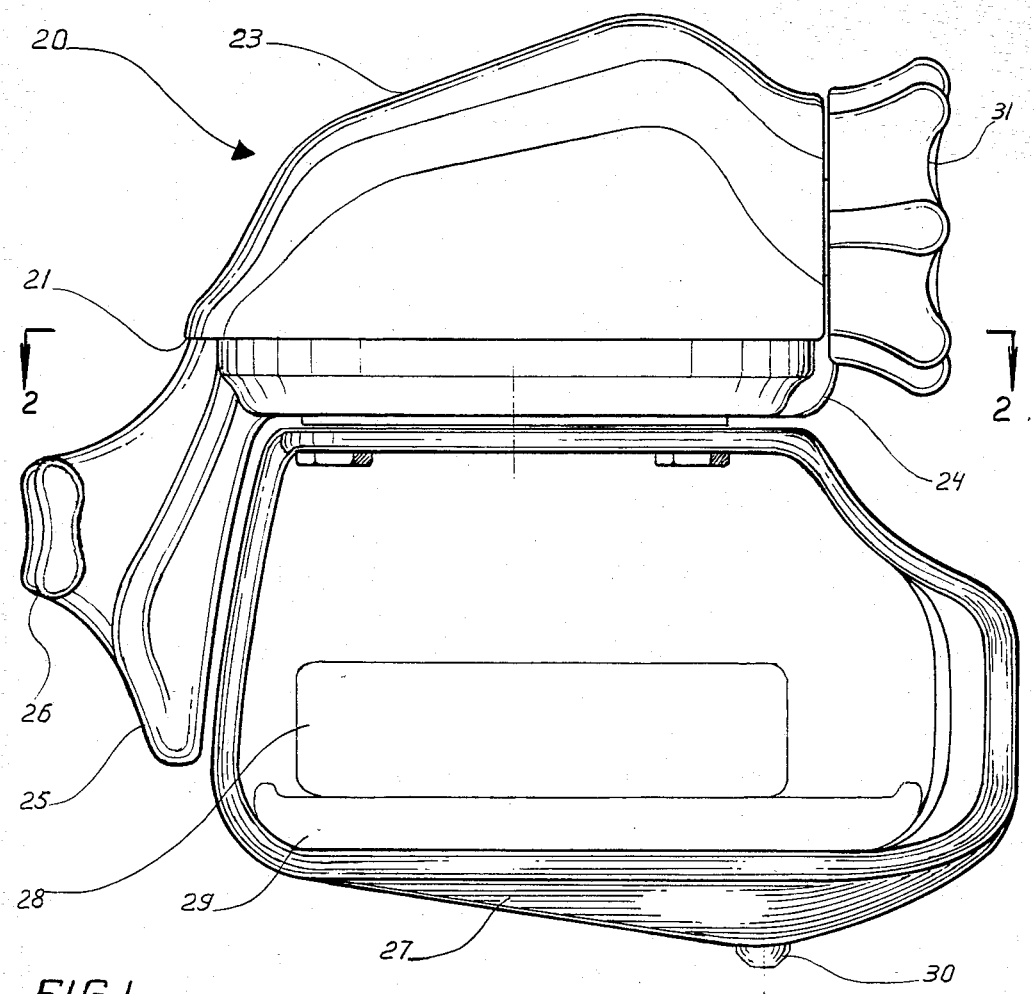
FIG. 1 is an overview of a valve made in accordance with the invention.

Referring to the Drawings, FIG. 1 provides a general view of a shower valve 20 made in accordance with the instant invention. The shower valve 20 includes a valve body 21 having a mixing section 23, and a flow interrupting section 24. The shower valve 20 includes a shield 25 having a handle portion 26 that can perform as a washcloth hanger, and a receptacle 27 for soap 28 and/or a shampoo container 29. The receptacle 27 includes an outlet 30 that can perform as a drain for the receptacle or as a dispenser for shampoo or soap product in liquid form contained within the recpetacle 27. A control handle 31 is provided upon the valve 20 for regulating the mix or hot and cold water exiting the mixing section 23.

Figures 7, 9:
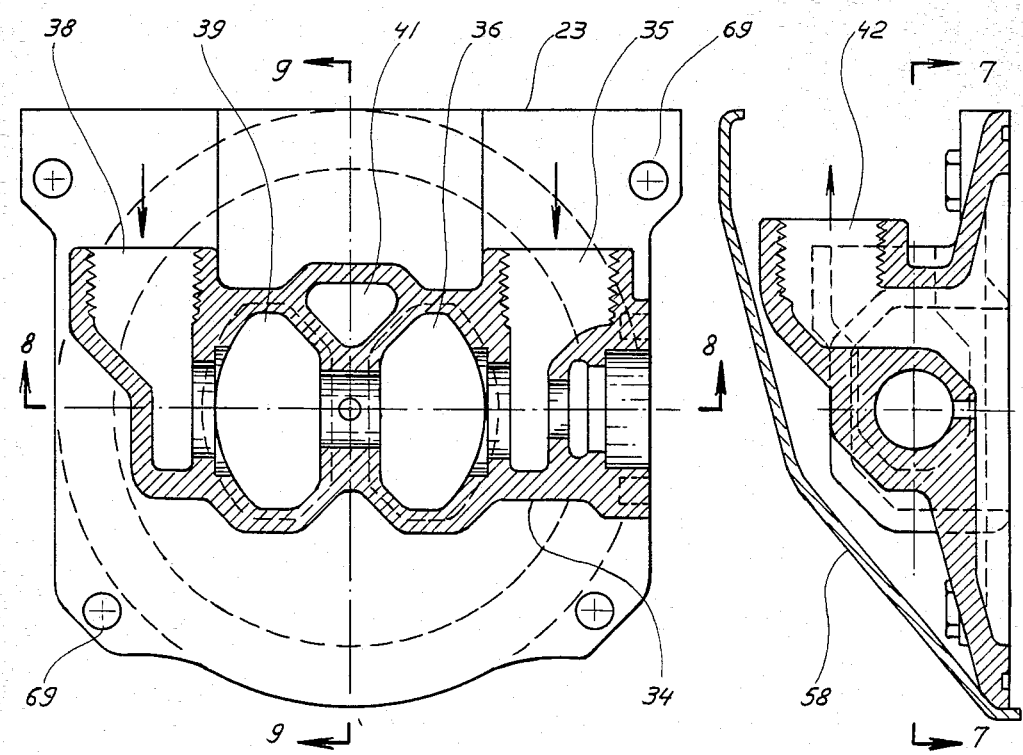
FIG. 7 is a top view in partial cross section of a mixing section of a valve made in accordance with the invention.
FIG. 9 is a section view of the mixing section of FIG. 7 taken 90° from the section view of FIG. 9.

Referring to FIG. 7, the mixing section 23 can be seen to include a ratioing means or body 34. The ratioing means or body 34 includes a cold water inlet 35, in liquid flow communication with a cold water chamber 36; a hot water inlet 38, in liquid flow communication with a hot water chamber 39; and a blended water chamber 41 in liquid flow communication with a blended water outlet 42, seen best in FIG. 9.

Figures 8, 10:
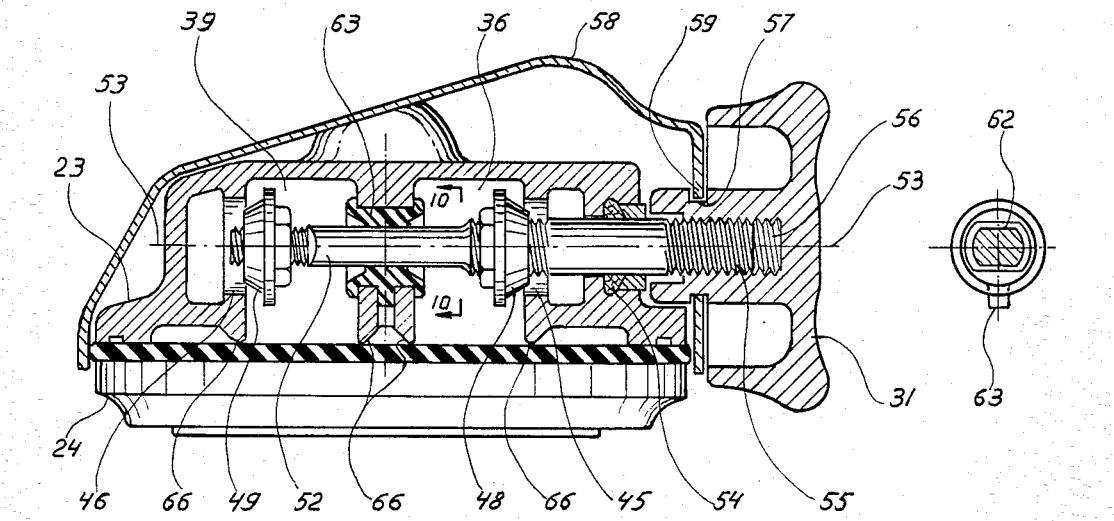
FIG. 8 is a section view of the mixing section of FIG. 7.
FIG. 10 is a section view of a shaft for use in the mixing section of FIG. 7.

Referring to FIG. 8, a cold water valve seat 45 and a hot water valve seat 46 are provided respectively upon the cold water chamber 36 and the hot water chamber 39 and perform to provide liquid flow communication between the chambers 36, 39 and the chamber 41. Generally concentricly shaped cold 48 and hot 49 water valve discs are provided configured to be received upon the seats 45, 46 whereby flow of water from a particular chamber 36, 39 can be terminated.

A shaft 52 is provided oriented along an axis 53. The conical discs 48, 49 are fixedly carried upon the shaft 52 at a predetermined longitudinal position along the shaft 52. The shaft 52 protrudes through the ratioing means 34. A seal or stuffing 54 is provided to preclude leakage of hot or cold water along the shaft 52 from the chamber 36. The shaft 52 terminated in a threaded portion 55.

The control handle 31 includes a recess 56 threadably receiving the threaded shaft portion 55 whereby rotation of the control handle 31 threadably draws the shaft 52 into the threaded recess 56 or withdraws the shaft 52 from the threaded recess 56 depending upon the rotational direction of control handle 31 movement.

The control handle 31 further includes a keeper notch 57 circumferenting the control handle. A decorative shield 58 or cover is provided surrounding the ratioing means 34, and the cover 58 includes a keeper lip 59 engaging the keeper notch 57 performing to retain the control handle in fixed dimensional relationship with the cover 58 and the ratioing means 34.

The shaft 52 includes a flattened portion 62 best seen in FIG. 11. A bearing 63 is provided within the ratioing means 34 configured to receive the flattened portion 62 snugly. The bearing 63 performs to support the shaft 52 along the axis 53 within the ratioing means 34 assuring that the discs 48, 49 are alignably received in the seats 45, 46. The flattened portion 62 of the shaft 52 co-operates with the bearing 63 to perform in preventing rotation of the shaft within the ratioing means 34 as the control handle 31 is turned to draw the shaft 52 within the threaded recess 56.

It may be seen that by rotational movement of the control handle 31, the valve discs 48, 49 can be advanced upon the seats 45, 46. It should be apparent that because of the discs 48, 49 being fixedly positioned upon the shaft 52, advancement of one disc 48 towards its corresponding seat 45, retracts the other disc 49 from its corresponding seat 46. The effect of such movement is to increase the flow of hot water from the chamber 39 and decrease the flow of cold water from the chamber 38 into the blended water chamber 41. Converse movement of the control handle 31 correspondingly reduces the flow of hot water and increases the flow of cold water into the blended water chamber 41. An essentially infinite variation in the ratio of hot and cold water available in the blended water chamber 41 can thereby be achieved.

The ratioing means includes, in addition, a diaphragm seat 66. The mixing section 23 is retained to the valve 20 using any suitable or conventional fastening means such as screws 69.

Figure 2:
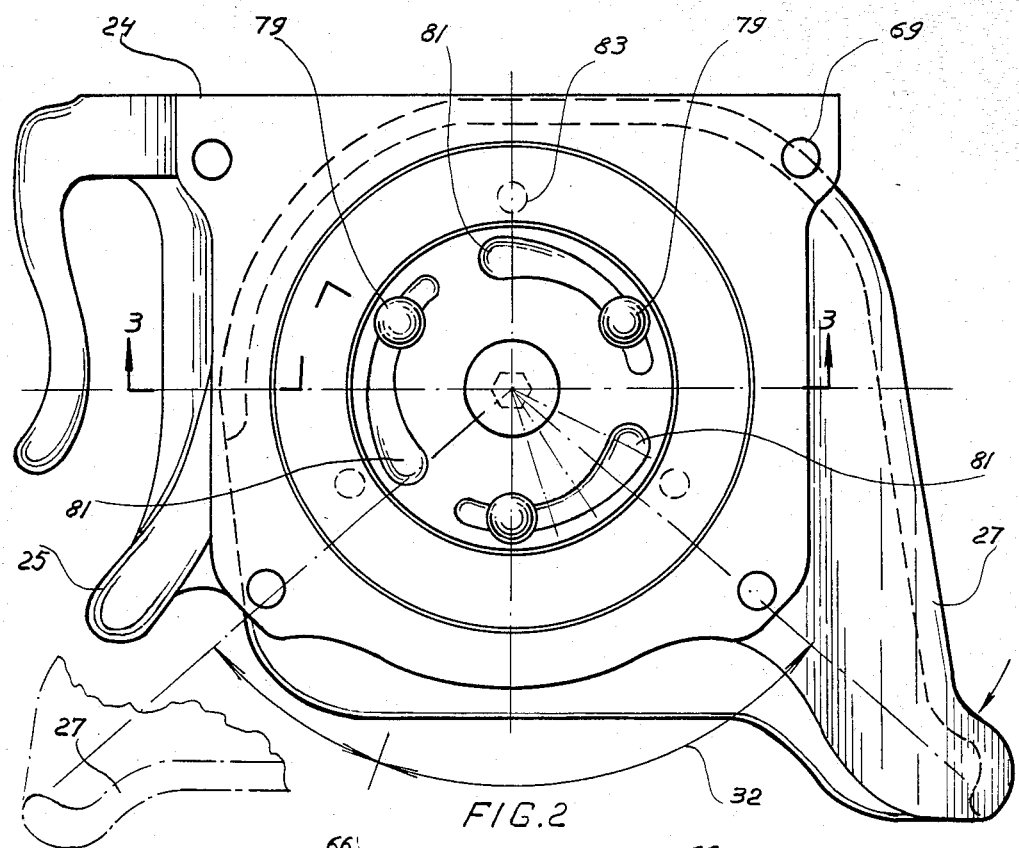
FIG. 2 is a top view in partial cross section of a valve made in accordance with the invention.
Figure 3:
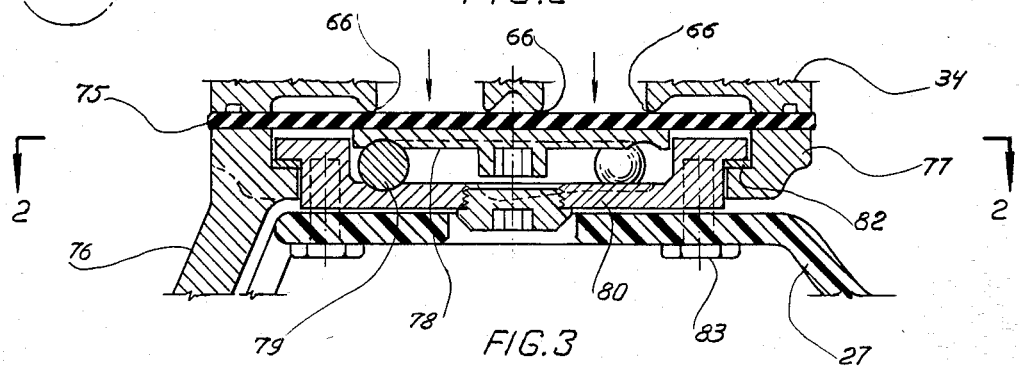
FIG. 3 is an elevational section view of a portion of the valve of FIG. 2.
Figure 4:
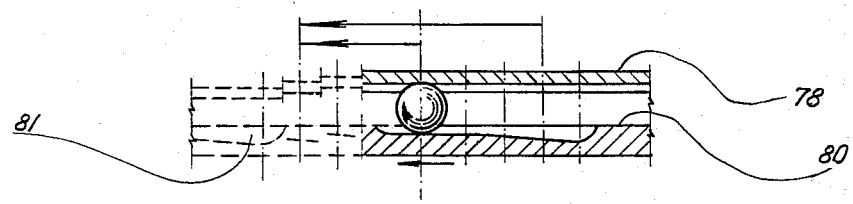
FIG. 4 is an elevational section view of a portion of the valve of FIG. 2 from a vantage point rotated somewhat from the view of FIG. 3.

Referring to FIGS. 2, 3, and 4, the flow interrupting section 24 includes a flow interrupter 75, in this best embodiment a diaphragm, and an actuating means 76 including a flow interrupting section body 77. The diaphragm 75 is generally imposed between the flow interrupting means 76 and the ratioing means 34 and also performs as a seal to preclude fluid leakage where the means 76 and 34 are joined. The diaphragm seats 66, as best seen in FIG. 9 are configured to be generally approximately flush with the interconnection between the body 77 and the ratioing means 34. Where the diaphragm is pressed into forceful contact with the valve seats 66, fluid flow from the chambers 36, 39 into the outlet chamber 41 is precluded, and flow of liquid from the valve 20 is arrested. Where the diaphragm is permitted to relax from forceful contact with the diaphragm seats 66, fluid flows readily from the chambers 36, 39, into the outlet chamber 41, and is available at the outlet 42.

A pallet 78 is provided configured to provide a relatively flat surface for forcefully pressing the diaphragm 75 against the valve seats 66. A plurality of supports 79 provide a generally geometrically balanced lifting support for the pallet 78. These ball-like supports 79 in turn find foundation upon a base 80 rotatingly received within the housing 77. The base includes a plurality or sloping recesses 81 formed into the base, their number being at least equal to the number of pallet supports 79 founded upon the base. Optionally, a sliding pad 82 may be received in the housing 77 for assisting in rotation of the base 80 within the housing 77.

The sloping recesses 81 are configured to receive the pallet supports 79 in a closely conforming relationship. Rotational movement of the base permits the pallet supports 79 to be received in the recesses 81 and permits the pallet 78 under the impetus of water pressure within the mixing section 23, to move downwardly. Downward movement of the pallet permits relaxation of the diaphragm 75 from forceful contact with the valve seats 66, permitting water flow into the outlet chamber 41 from the chambers 36, 39. Conversely, opposite rotation of the base forces the pallet supports 79 from the recesses 81, lifting the pallet 78, and forcing the diaphragm into forceful contact with the valve seats 66. Water flow into the outlet chamber 41 is thereby terminated.

The receptacle 27 is connected to the base 80 whereby rotation of the receptacle 27 along arc line 32 as shown in FIG. 2, also rotates the base 80. Connection may be made by any suitable or conventional means such as by studs 83. The recesses 81 are configured so that an approximate 90°–100° rotation of the base, and thereby of the receptacle 27, suffices to foreclose water flow from the valve 20. Preferable a 15° rotation of the receptacle 27 suffices to terminate flow under most circumstances.

The receptacle 27 is connected to the base whereby when the receptacle is closed and soap or shampoo enclosed therein is inaccessible, water flow is permitted through the valve 20, the diaphragm 75 being permitted to relax from the diaphragm seats 66. Rotational movement along arc line 32 as shown in FIG. 2 of the receptacle 27 to the full line position as shown in FIG. 2 and the position as shown in FIG. 1, that is, from a closed position whereby access to soap is effectively precluded by the shield-like handle 25 to a position whereby soap or shampoo within the receptacle may be accessed, lifts the pallet 78 into contact with the diaphragm 75, pressing the diaphragm into firm or forceful contact with the diaphragm seats 66. In this manner, water flow through the valve is terminated while a person using the valve 20 for a shower water supply is lathering. Conversely, while the soap dish is in the closed position as shown by phantom lines in FIG. 2, access to the soap is precluded.

Figure 5:
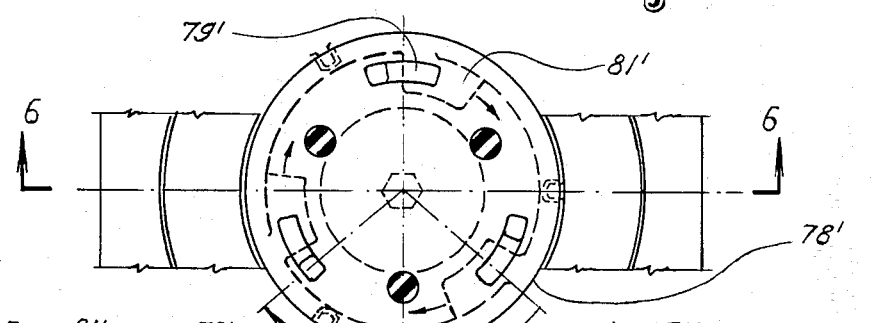
FIG. 5 is a top view in partial cross section of an alternate preferred embodiment of a valve made in accordance with the invention.
Figure 6:
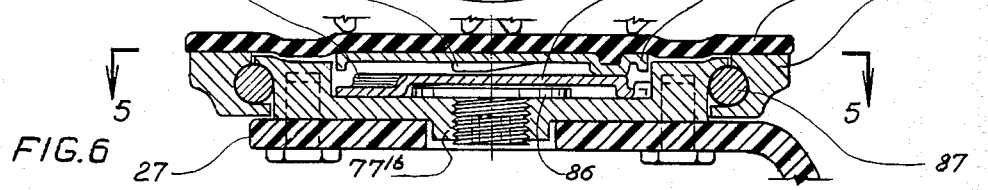
FIG. 6 is an elevational section view of a portion of the valve of FIG. 5.

In an equally preferred embodiment, and referring to FIGS. 5, and 6, the pallet supports 79' are knob like protrusions, having a sloping edge, and are formed into the pallet 78'. The sloping recesses 81' are configured to receive the knob like pallet supports 79' in a base 80'. The base rests upon an adjustable table 86 that can be threadably raised or lowered to assure a forceful press of the pallet 78' against the diaphragm 75' and therefore of the diaphragm 75' against the diaphragm seats 66. The housing includes two portions 77'a and 77'b sealed for liquid flow by an "O" ring 87 of suitable or conventional material.

The diaphragm 75, 75' is generally formed of a suitable or conventional elastomer such a butyl rubber or a chlorinated or fluorinated elastomeric rubber like material. The housing 77, 77'a, 77'b, the base 80, 80', the pallet 78, 78', the pallet supports 79, 79', the receptacle 26, and the table 86 can be formed from any suitable or conventional machinable or castable material including thermosetting and thermoplastic resins, metal, and composite materials such as reinforced fibre glass. Likewise the components of the mixing section 23 may be formed from similar materials. Generally the seats 45, 46 should be of a harder material to resist erosion, as is well known in the art of valves.

Where water is available at a temperature suitable for showering from a single source, a mixing section 23 is unnecessary. The invention may be simplified by providing an inlet and outlet (not shown) separated by a diaphragm seat (not shown) permitting the diaphragm 75 to be interposed to interrupt liquid flow between inlet and outlet.

In another equally preferred embodiment where a single source of desirably temperate shower water is available, the valve 20 may be a ball type valve (not shown) of any suitable or conventional type having a ball and stem (not shown) a receptacle 26 in accordance with the invention being affixed to the stem for rotation fixedly with the stem whereby opening and closing of the receptacle turns the stem and thereby the ball enabling interruption of water flow through the ball valve.

While a preferred embodiment of the invention has been shown and described in detail, it should be apparent that various modifications and alterations can be made thereto without departing from the scope of the claims that follow.

What is claimed is:
1. A valve for interrupting the flow of water between a source and a showerhead comprising: a valve body; means within the valve body for interrupting water flow through the valve body; and actuating means for imposing the interrupting means into the water flow thereby terminating water flow through the valve body, the actuating means including a receptacle configured to receive a soap product and being moveable between a closed position and a position whereby soap can be retrieved from the receptacle, the actuator means being configured whereby with the receptacle in the closed position water flow through the valve body is unimpaired by the interrupting means and with the receptacle in the retrieval position water flow through the valve is interrupted by the interrupting means.

2. The valve of claim 1, the source being a dual source of hot and cold water, and the valve including a section for mixing the hot and cold water sources in a virtually infinite ratio.

3. The valve of claim 1, the valve being a ball valve including a flow interrupting ball, and an actuator having a stem for moving the ball from a flow non interrupting to a flow interrupting position within the valve, and a soap receptacle attached to the stem for actuating the stem.

4. The valve of claim 1, the valve including a body having an inlet and an outlet; a diaphragm seat arranged between the inlet and outlet; a diaphragm; a pallet for pressing the diaphragm against the seat to terminate water flow through the valve; a base rotatingly received within the valve body and including a plurality of sloping recesses formed in the base; a plurality of pallet supports configured to be received in the sloping recesses, and positioned between the base and pallet, the number of supports being equal to the number of sloping recesses; and the soap receptacle being attached to the base whereby movement of the receptacle to a closed position rotates the base whereby the supports are received in the sloping recesses permitting movement of the pallet and diaphragm away from the diaphragm seat, and whereby movement of the receptacle to a soap retrieving position rotates the base whereby the pallet supports are forced from the sloping recesses and move the pallet towards the diaphragm seat forcing the diaphragm against the diaphragm seat and interrupting water flow through the valve.

5. The valve of claim 1, the valve including a body having separate sources of hot and cold water; an outlet; a ratioing means for proportioning flow of hot and cold water through the valve body; a diaphragm seat arranged between the supplies of water and the outlet; a diaphragm; a pallet for pressing the diaphragm against the seat to terminate water flow through the valve; a base rotatingly received within the valve body and including a plurality of sloping recesses formed in the base; a plurality of pallet supports configured to be received in the sloping recesses, and positioned between the base and pallet, the number of supports being equal to the number of sloping recesses; and the soap receptacle being attached to the base whereby movement of the receptacle to a closed position rotates the base whereby the supports are received in the sloping recesses permitting movement of the diaphragm away from the diaphragm seat, and movement of the receptacle to a soap retrieving position rotates the base whereby the supports are forced from the sloping recesses and move the pallet forcing the diaphragm against the diaphragm seat and and interrupting water flow through the valve.

6. The valve of claim 5, the ratioing means including separate receiving chambers connectable to receive the separate sources of hot and cold water; a pair of valve seats formed one into each of the receiving chambers opposing one another along a line of axis; a pair of discs; a shaft located along the line of axis and carrying the discs in a fixed position upon the shaft; means for slidingly advancing and retracting the shaft along the line of axis from a position whereby one disc is received in a corresponding valve seat thereby closing off admission of one source of water to the valve body, to a position whereby the other disc is received in the remaining valve seat thereby closing off admission of the other source of water to the valve body; and bearing means for supporting the shaft along the line of axis and for preventing rotation of the shaft.

7. The valve of claim 6, the means for advancing and retracting the shaft being a threaded interconnection between the shaft and a control handle, rotation of the control handle drawing the shaft within the control handle and thereby drivingly advancing and retracting the shaft within the vavle body along the line of axis the control handly being located external to the valve body, and being sealed against flow of water along the shaft from the valve body to a point external to the valve body.

* * * * *